Dec. 11, 1923.
R. C. BLEDSOE
DUMPING VEHICLE
Filed May 20, 1922    2 Sheets-Sheet 2
1,476,871
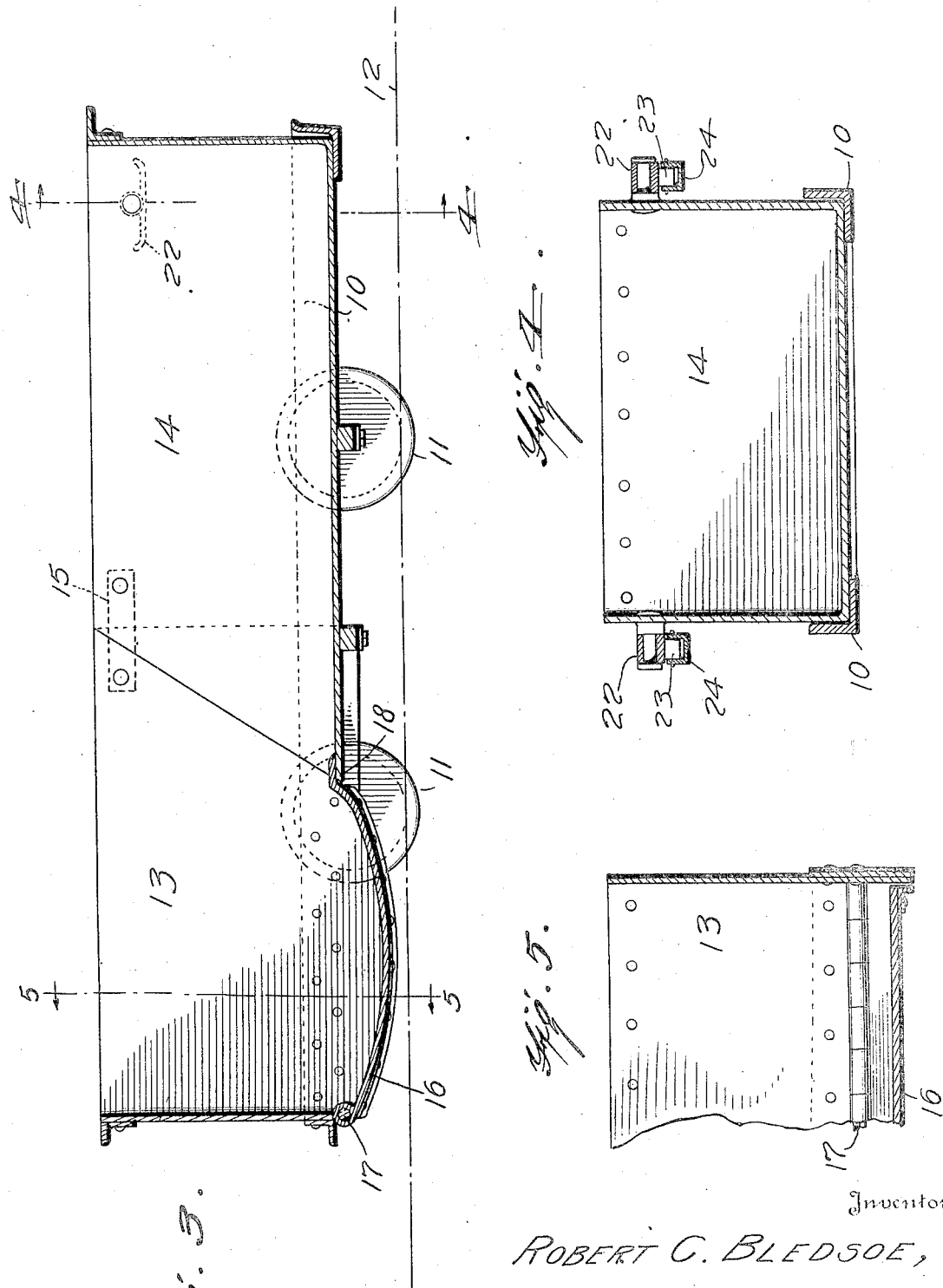
Inventor
Robert C. Bledsoe,
By Watson E. Coleman
Attorney Patented Dec. 11, 1923.

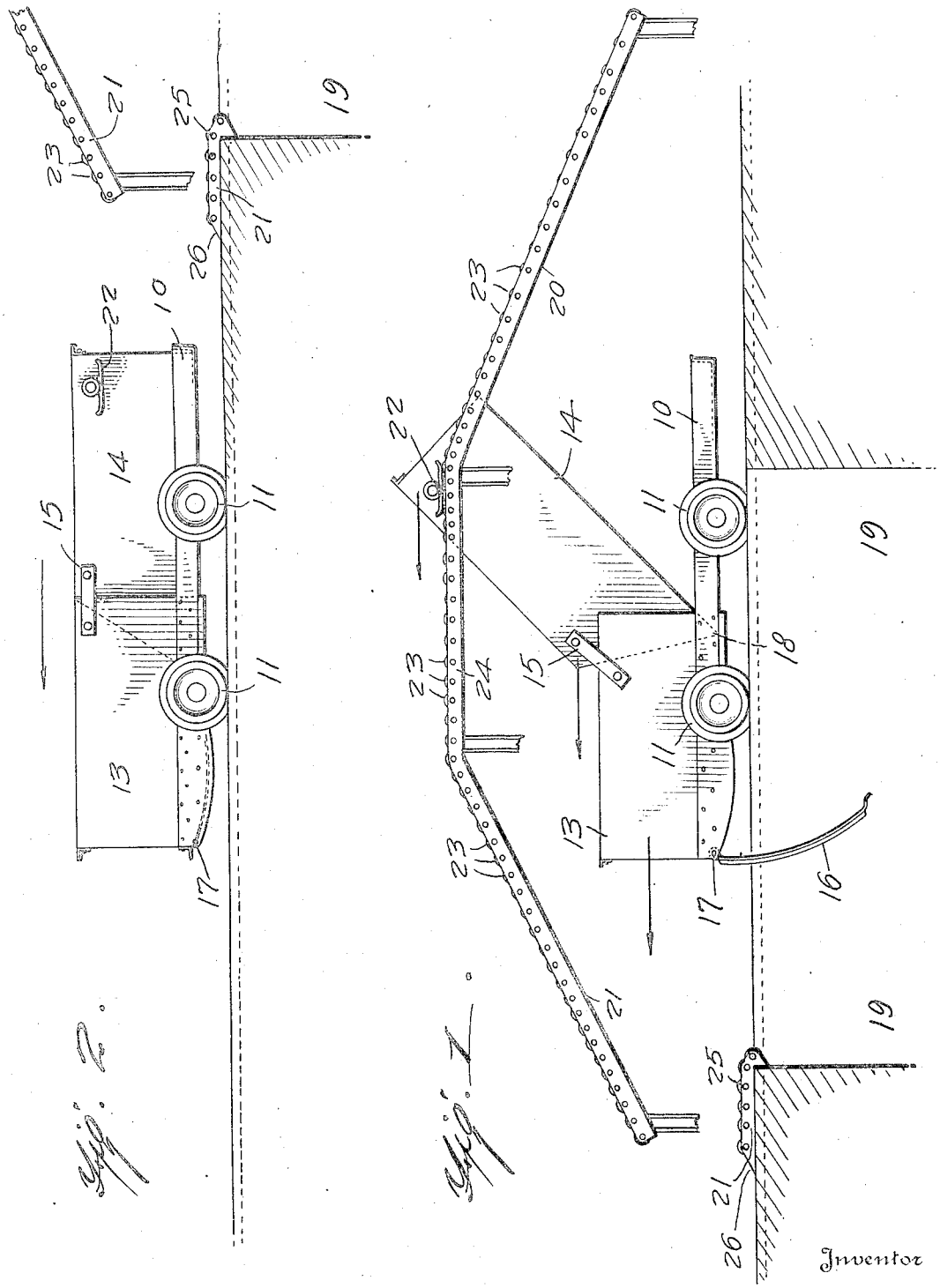

1,476,871

UNITED STATES PATENT OFFICE.

ROBERT C. BLEDSOE, OF LIGGETT, KENTUCKY, ASSIGNOR OF ONE-HALF TO GALE D. BENGY, OF LIGGETT, KENTUCKY.

DUMPING VEHICLE.

Application filed May 20, 1922. Serial No. 562,397.

*To all whom it may concern:*

Be it known that I, ROBERT C. BLEDSOE, a citizen of the United States, residing at Liggett, in the county of Harlan and State of Kentucky, have invented certain new and useful Improvements in Dumping Vehicles, of which the following is a specification, reference being had to the accompanying drawings.

This invention relates to dumping vehicles, and more particularly to an automatically dumped conveyor car for use in mines and the like.

An important object of the invention is to provide means for automatically dumping a car without the necessity of checking the motion thereof.

A further object of the invention is to provide means whereby the carrying capacity of the dumping car may be greatly enlarged.

A still further object of the invention is to provide in combination with a tiltable dumping body and means for automatically tripping said body to dump the same, a stationary body having a closure which is released by the tilting of the tiltable body so that the stationary body is discharged simultaneously with the tiltable body.

An additional object of the invention is to provide in a device of this character, a simple and durable construction which may be readily applied to the dumping systems now employed in mines and the like.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a side elevation partially in section showing apparatus constructed in accordance with my invention, and a car in the dumping position at the tipple;

Figure 2 is a similar view showing the car leaving the tipple;

Figure 3 is an enlarged sectional view taken through the car;

Figure 4 is a section taken on the line 4—4 of Figure 3; and

Figure 5 is a fragmentary section taken on the line 5—5 of Figure 3.

Referring now more particularly to the drawings, the numeral 10 designates a wheel supported frame, in the present instance the supporting wheels being disclosed as flanged wheels 11 operating upon a track 12. The wheel supported frame is provided at one end thereof with a relatively stationary body 13 and at the opposite end thereof with a tilting body 14 suitably pivotally connected at its forward end and with the frame or with the body 13, as indicated at 15, so that the rear end thereof may be elevated. The bodies 13 and 14 have their adjacent ends interengaging so that when the same are resting upon and supported by the frame 10, a continuous body is formed, preventing leakage at the sides thereof.

The body 13 is provided in its bottom with a hinged bottom plate 16, the hinges of which are disposed at the forward end of the body 13, as indicated at 17, and the free end of which is adapted, when the body is in the normal position, to overlie a lip 18 formed at the end of the bottom of the tilting body 14 and be supported thereby. When, however, the free end of the tilting body is elevated, the hinged bottom 16 is released from the lip and falls downwardly to permit the passage not only of the contents of the body 13 but those of the body 14 through the space formerly occupied by the hinged bottom 16.

In order to provide for tripping of the body 14 to elevate the free end thereof, I provide at the bin or tipple 19 into which the vehicle is discharged and which is arranged beneath the tracks 12 upon which the vehicle operates, tripping rails 20, the ends of which incline downwardly, as indicated at 21, and have their lower extremities disposed at such a height they engage beneath abutment members 22 carried by the free end of the tilting body 14 and preferably consisting of a curved section of angle iron secured to each side of the body, it being understood that a rail 20 is arranged at each side of the track. These rails are preferably provided upon their surfaces with rollers 23 upon which the abutment members 22 will operate. The central portion of the track 60, as indicated at 24, represents the maximum height of elevation of the free end of the car and may be made any desired length, depending upon the capacity of the car, so that the contents thereof may be fully discharged. Between the tracks 12 at each end of the tracks 20, I provide a door closing device 25 consisting of a block having the ends thereof disposed toward the bin 19 beveled, as indicated at 25.

In the operation of my device, as the car approaches the bin, the abutment members 22 engage with the tracks 20 and the free end of the tilting receptacle is elevated, thereby freeing the hinged bottom 16 of the stationary body or receptacle, and permitting the same to swing downwardly. As the abutment members continue over the tracks 20, the contents of the receptacles are discharged and as the vehicle continues in its movement, the abutment member passes down the inclined portion 21 at the opposite end of the tracks 20, lowering the pivoted body portion 14. At this time the hinged door 16 comes into engagement with the door closer 25 at the exit end of the tracks 20 and is swung upwardly and while held in its raised position, the hinged receptacle is lowered sufficiently to permit engagement of the lip 18 under the free end of the door to support the same and the vehicle is accordingly ready for refilling and redumping.

From the foregoing it is believed to be obvious that a dumping vehicle constructed in accordance with my invention is particularly well adapted for the use for which it is intended for the reason that the same may be automatically dumped and for the reason that the peculiar construction of the same enables the carrying of a greater capacity load than the ordinary type of dumping vehicle, it being understood that this load may be carried without the necessity of applying sufficient strain to tilt the entire load, as is necessary with those types of dumping vehicles with which I am familiar. It will furthermore be obvious that the construction hereinbefore employed may be to a great extent modified and altered without in any manner departing from the spirit of my invention, and I accordingly do not limit myself thereto except as hereinafter claimed.

I claim:—

1. In combination, a wheel supported frame, a relatively stationary body portion carried by the frame and provided with a hinged bottom, a tiltable body portion carried by the frame and having a lip supporting the free end of said hinged bottom, the tilting of said tiltable body releasing said hinged bottom, and means for tilting said tiltable body.

2. In combination, a chassis, a relatively stationary body carried thereby and having a hinged bottom, and a tiltable body carried by the frame and shiftable to raised and lowered positions thereon, said tiltable body when in the lowered position having portions supporting the free end of the hinge bottom to maintain the same in closed position and when raised releasing said bottom to permit opening thereof.

3. In combination, a chassis, a relatively stationary body carried thereby and having a hinged bottom, a tiltable body carried by the frame and shiftable to raised and lowered positions thereon, said tiltable body when in the lowered position having portions supporting the free end of the hinge bottom to maintain the same in closed position and when raised releasing said bottom to permit opening thereof, and means for raising said tiltable body.

4. In a dumping mechanism, a wheel supported frame adapted for travel in a fixed path, a relatively stationary body carried thereby and having a hinged bottom, a tiltable body likewise carried thereby and shiftable to raised and lowered positions, said tiltable body having portions engaging and supporting the free end of the hinged bottom when the tiltable body is in the lowered position, and means arranged adjacent said fixed path for engaging and raising the tiltable body.

5. In a dumping mechanism, a wheel supported frame adapted for travel in a fixed path, a relatively stationary body carried thereby and having a hinged bottom, a tiltable body likewise carried thereby and shiftable to raised and lowered positions, said tiltable body having portions engaging and supporting the free end of the hinged bottom when the tiltable body is in the lowered position, means arranged adjacent said fixed path for engaging and raising the tiltable body, and means arranged in said fixed path for engaging and elevating said hinged bottom prior to the release of the tiltable body by the first named means.

6. In combination with a wheel supported frame traveling in a fixed path, tracks arranged upon opposite sides of the path and having the ends thereof inclined, a relatively fixed body carried by the wheel supported frame and having a hinged bottom, a tiltable body portion carried by the frame and having portions supporting the free end of said hinged bottom when the tiltable body is in normal horizontal position and releasing the same when the tiltable body is tilted, and means carried by said tiltable body and engaging said tracks for tilting said tiltable body.

7. In combination with a wheel supported frame traveling in a fixed path, tracks arranged upon opposite sides of the path and having the ends thereof inclined, a relatively fixed body carried by the wheel supported frame and having a hinged bottom, a tiltable body portion carried by the frame and having portions supporting the free end of said hinged bottom when the tiltable body is in normal position and releasing the same when the tiltable body is tilted, means carried by said tiltable body and engaging said tracks for tilting said tiltable body, and means arranged in said path adjacent the ends of said tracks for engaging said hinged bottom to elevate the same and maintain the same in elevated position until said tiltable body is released from said tracks.

In testimony whereof I hereunto affix my signature.

ROBERT C. BLEDSOE.